United States Patent Office 3,206,485
Patented Sept. 14, 1965

3,206,485
WATER-INSOLUBLE SALTS OF ARYLOXY MONO-CARBOXYLIC ACIDS AND AMIDES OF POLY-ALKYLENE POLYAMINES AND MONOCARBOX-YLIC ACIDS
Arthur E. Pflaumer, P.O. Box 309, Norristown, Pa.
No Drawing. Filed June 21, 1962, Ser. No. 204,063
10 Claims. (Cl. 260—404.5)

This invention relates to:
 (a) Water-insoluble salts of herbicidal monocarboxylic acids with amidoamine salt-forming compounds,
 (b) Herbicidal compositions containing such salts dissolved in hydrocarbon solvents, and
 (c) Methods for the preparation of these new materials.

FIELD OF INVENTION

Herbicides are now used in very large quantities for controlling the growth of vegetation. For example, they are used to eradicate weeds from the sides of highways and from railroad right-of-ways. Large quantities of these materials are also used to control the growth of weeds on lands cultivated with cereal grains or other economic crops.

Herbicidal compositions also are being used in large amounts for controlling weeds in lawns of individual homes and industrial or recreational institutions, e.g., golf courses, parks or the like.

Herbicides have acquired an important place in the field of agricultural chemicals because they can do the job of reducing or eliminating growth of weeds or other undesirable vegetation more cheaply and effectively than other known methods. For example, one method employed in the past to clear railroad right-of-ways of brush, weeds and other growth was to burn off the undesired growth with flame throwers. As drastic as this flame spraying may be, it is more expensive and less effective than the use of highly active herbicidal materials which are known and are now commercially available, particularly the aryloxyalkylane monocarboxylic acids, typically, 2,4-dichlorophenoxy acetic acid and 2,4,5-trichlorophenoxy acetic acid (more popularly referred to as 2,4-D and 2,4,5-T).

Although the general idea of using herbicidal materials for vegetation growth control is a good one, it creates a number of troublesome problems when herbicidal monocarboxylic acids are used as the growth control agent. For example, the herbicidal acids per se are not soluble in water or other inexpensive solvents, and it has been necessary to attempt to use of derivatives of the acids which have reasonable water or solvent solubilities to permit the herbicidal agent to be spread over the growth area. Water soluble salts of the acids, however, are generally unsatisfactory because such salts are so easily washed off the treated plants or leached from the soil after application. Another problem which has been experienced in the past has been the tendency of some of the derivatives of the acids to "drift." This term is used in the trade to describe the migration of herbicides from the area of application to adjacent areas apparently due to partial vaporization of the herbicidal agent after application. This "drifting" quality of some herbicidal acid derivatives has made it impossible to commercially utilize many herbicidal derivatives which appeared very attractive from the viewpoint of the cost of manufacture and ease of application. Actually, the "drift" tendency of some herbicides became such a serious problem and caused such widespread damage to valuable crops that some state legislatures have passed laws prohibiting the use of certain classes of herbicidal materials. This has prompted herbicide manufacturers, agricultural experimental stations and many others to try to develop new and improved forms of herbicides which are free of "drift" and which are, at the same time, sufficiently soluble in useable diluents to make the proper application of the materials feasible.

Herbicidal agents must be applied in relatively diluted form or be spread very thinly in order to reduce costs and also to prevent damage to desirable valuable crops where they are used for the control of weeds in cultivated crops. Effective spreading of the herbicide is accomplished by suitable dilution of the herbicidal agent which, as previously indicated, is preferably water-insoluble. Dilution can be accomplished by the use of cheap hydrocarbon solvents such as diesel oil, kerosene or the like but such solvent solutions, particularly when applied over large areas, may be unsatisfactory because of the "drift" characteristics of such solvent solutions. This has lead to the development of emulsion systems for providing necessary dilution of the active herbicidal agent and satisfactory spreading of the material over the growth area to be treated. Thus, if herbicidal materials are properly incorporated into water-in-oil emulsions that have proportions of ingredients to form emulsions having a viscosity high enough to approach the consistency of salad dressing or mayonnaise, such emulsions can be dispersed upon vegetated areas by dropping or projecting the emulsion onto a disc rotating at high speed. This sling-spray method of spreading is currently used and approved in most areas for herbicide application.

Research and development work mentioned above directed at providing new and improved herbicides has led to the provision of a wide variety of different forms of herbicidal materials. There are, for example, alkanolamine salts of herbicidal acids (see U.S. 2,515,198), complex alkanolamine esters of herbicidal (see U.S. 2,771,-477), salts of herbicidal acids with polyamino compounds (see U.S. 2,519,780 and 2,843,471) and certain water-insoluble salts of herbicidal acids with aliphatic amines (see U.S. 2,900,411). These represent only a small portion of a multitude of various forms of herbicidal compositions, a majority of which have never attained any commercial importance and a few of which have been actually sold commercially. So many different forms of herbicides have been developed which are based upon herbicidal acids, the agricultural industry and related groups dealing with these products have developed a standard term for designating the herbicidally active content of a composition, namely, the "pound-gallon." This term means the amount of actual herbicidal acid or a quantity of agent necessary to provide the equivalent thereof in a particular composition. A "two pound-gallon" means a herbicidal composition which contains two pounds of herbicidal monocarboxylic acid, or the larger quantity of a derivative of the acid necessary to provide the equivalent of two pounds of the acid in each gallon of the composition. The industry has also generally now accepted diesel fuel or equivalently cheap solvent as the diluent, in addition to water as economically suitable for use in herbicidal compositions, with the possible exception of special consumer products which are able to sustain the use of more costly diluents or other ingredients.

OBJECTS

A principal object of the invention is the provision of new improvements in herbicidal compositions that may be mixed with water to form viscous water-in-oil emulsions to be used in the control and growth of vegetation. Further objects include:

(1) The provision of new water-insoluble salts of herbicidal monocarboxylic acids.

(2) The provision of herbicidal water-insoluble salts that can be dissolved in diesel fuel or similar hydrocarbon solvents to give brilliantly clear solutions containing a relatively high degree of active herbicidal material, e.g., at least a two pound-gallon.

(3) The provision of herbicidal compositions that can be made and sold at low cost relative to their active herbicide content because they do not include expensive solvents, emulsifiers or other additives.

(4) The provision of herbicidal concentrates in which the herbicidal material is present as a salt that functions as an emulsifying agent to cause the concentrate to form W/O emulsions when mixed with water.

(5) The provision of herbicidal concentrates which may be easily mixed with water in the field to form viscous W/O emulsions that may be applied by the sling-spray technique.

(6) The provision of methods for controlling the viscosity of herbicidal concentrates and the viscosity of emulsions resulting from such concentrates.

(7) The provision of salts of herbicidal acids which act as solvents for the herbicidal acids from which they are formed, thereby making it possible to create liquid compositions containing a relatively very high amount of active herbicidal material.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

These objects are accomplished according to the present invention by the formation of salts from a herbicidal monocarboxylic acid with an alkyl monocarboxylic acid amide of a polyalkylene polyamine. The acid from which the amide is formed is chosen, in conjunction with its polyamine component, to give a final salt of desired viscosity and good solubility in diesel fuel or other hydrocarbon solvent. Use of an alkyl monocarboxylic acid of too high molecular weight may produce with some polyamines, a final salt that is too viscous. Conversely, with some polyamines, the very low molecular weight acids may form final salts which do not have the desired hydrocarbon solubility. Use of acids having 6 to 24 carbon atoms have been found to be most useful.

By way of graphic example, a preferred class of the new herbicidal salts of the present invention may be represented by the following formula:

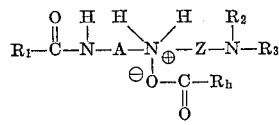

wherein $R_1$ is an alkyl, alkenyl, cycloalkyl or aryl radical of 5 to 23 carbon atoms, $R_2$ is hydrogen or $R_1CO—$, $R_3$ is hydrogen or alkyl or alkenyl of 1 to 20 carbon atoms, A is alkylene, cycloalkylene or arylene, particularly 2–6 carbon alkylene, cyclohexylene and phenylene, $R_h$ is the radical of a herbicidal acid, particularly aryloxyalkane monocarboxylic acids, and Z is a divalent organic radical selected from the group —A— or

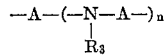

where $n$ is a positive integer 1 through 6.

In those cases where $R_2$ is hydrogen, the corresponding nitrogen atom may involve a second salt group with $R_1COOH$ or $R_hCOOH$.

From the foregoing formula, it will be seen that herbicidal salts in accordance with this invention may be formed from monoamides of polyamines or from polyamides of polyamines which contain at least one salt-forming amino group. It has been found that herbicidal salts formed from the polyamides, particularly the diamides, give perfectly clear solutions in diesel fuel and similar hydrocarbon solvents having a boiling point of 200° C. and upwards to yield brilliantly clear solutions. On the other hand, herbicidal salts formed from the monoamides, in some cases and particularly with amides of low molecular weight acids, may not give brilliantly clear solutions in diesel fuel. It has been found that by mixing a little free fatty acid with the resulting herbicidal salt of the monoamide, the resulting mixture has high solubility in diesel fuel and related solvents and will give brilliantly clear solutions.

It is a further discovery of the present invention that the addition of free fatty acid to the new herbicidal salts permits control of viscosity of the resulting concentrate formed of a solution of the herbicidal salt in diesel fuel or related hydrocarbon solvents. Moreover, the addition of free fatty acid permits the control of viscosity of emulsions which are formed by mixing water with the herbicidal concentrate. The greater the amount of free fatty acid employed in such mixtures, the lower the viscosity of the resulting concentrate and also the lower the viscosity of an emulsion formed by mixing water with the concentrate. Hence, this addition of small amounts of free fatty acids provide the compounder of herbicidal compositions with a control of viscosity and a wider selection of herbicidal acids, salt forming amides and amide forming acids than could otherwise be used because of solubility problems or viscosity problems.

In addition to the discovery of this control effect of fatty acids, the success of the present invention is due in part to the discovery that the herbicidal salts as described function as solvents for the free herbicidal acids. This solvent function makes it possible to create herbicidal compositions having a very high active ingredient content, i.e., herbicidal concentrates containing 2 to 4 pounds of active herbicidal acids or its equivalent per gallon of liquid can be prepared.

Yet another discovery of this invention is the fact that the herbicidal salts per se serve as emulsifying agents to form water-in-oil emulsions. Hence, when mixed with diesel fuel or other hydrocarbon solvents and/or free herbicidal acids, the resulting products can be mixed with varying amounts of water to give W/O emulsions. As is known in the art, the greater ratio of water to oil in such emulsions, the higher the viscosity. It is possible with these materials to employ such relatively high proportions of water that final, stable emulsions are formed which have a semi-solid consistency comparable to salad dressing or mayonnaise.

A still further advantage noted for the new herbicidal salts is their extremely low volatility and substantial absence of any "drifting" when used to control growth of vegetation in areas adjacent to sensitive crops.

EXAMPLES

A more complete understanding of the new herbicidal products, compositions and methods of preparation may be had by reference to the following examples in which all parts and percentages are by weight unless otherwise specified.

Example 1

Salt of tall oil fatty acid amide of diethylene triamine and trichlorophenoxy acetic acid.

Diethylene triamine (103 parts) was mixed with 570 parts of tall oil fatty acids and the mixture was reacted in a flask equipped with a fractionating column for reflux. The reaction was continued at reflux until the temperature reached 220° C. and about 36 parts of water had been removed.

The reaction product in the still pot upon cooling to room temperature (20° C.) was a reddish viscous liquid which would become an opaque paste if the temperature was reduced to about 5° C. The resulting product was virtually insoluble in water, i.e., its solubility in water at 20° C. was 0.012%.

The reaction proceeds according to the following equation:

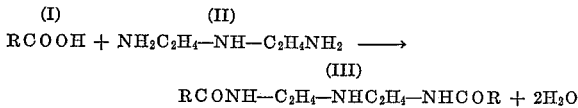

$$RCONH-C_2H_4-NHC_2H_4-NHCOR + 2H_2O$$

The resulting 637 parts of fatty amido amine was reacted with 255 parts of trichlorophenoxy acetic acid by warming a mixture of the two materials together at 100° C. for about one hour. The resulting salt was a clear, viscous liquid which remained clear even when cooled to 0° C. The salt forming reaction proceeds according to the following equation:

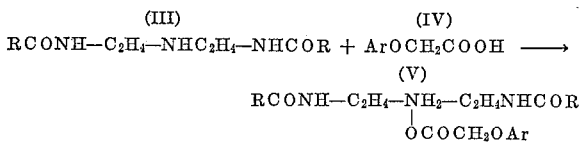

In other cases, the neutralization of (III) was conducted successfully at temperatures between 40° and 100° C. At temperatures as low as 20° C., the mixture could not be stirred adequately because of the viscosity and occluded air could not escape. To determine the exact point where the amine group is just neutralized in accordance with the foregoing equation is difficult since the endpoint is not readily apparent. If an excess of neutralizing herbicidal acid is used, however, this is not detrimental to the preparation of herbicidal compositions since the extra free acid dissolves in the salt product and increases the active herbicide content of the resulting product.

The salt (V), 84 parts, was diluted with 20 parts of diesel fuel to give a clear solution containing 2 pounds per gallon of trichlorophenoxy acetic acid for use as a herbicidal concentrate. A portion of this concentrate was diluted with an equal volume of diesel fuel and while the resulting solution was vigorously stirred with a motor-driven propeller-type stirrer, 2 volumes of water were added streamwise to it to form a stable W/O emulsion. The emulsion when formed was found to have a viscosity at 20° C. of about 4600 centipoises.

*Example 2*

Use of amido amine salt as solvent for herbicidal acid.

To the salt (V) of Example 1 (890 parts) there was added an additional 250 parts of trichlorophenoxy acetic acid and the mixture was stirred for about 15 minutes at 50° C. until all of the acid had dissolved in the liquid. The resulting solution was found to be soluble in diesel fuel and to be useable in forming W/O emulsions in the same manner as set forth in Example 1.

*Example 3*

The fatty amido amine (III) of Example 1 (96 parts) was mixed with 128 parts of 2,4,5-trichlorophenoxy acetic acid and stirred at 100° C. for 2 hours. Upon cooling to about 20° C., a viscous clear reddish liquid (VI) was obtained. This solution was found to be miscible in all proportions with diesel fuel to give clear viscous to thin liquids depending upon the amount of diesel fuel mixed with the viscous liquid. Water added to the diesel fuel solutions containing as little as about 10% by weight of the product (VI) readily emulsified with adequate mixing to give W/O emulsions.

*Example 4*

Salt of tall oil fatty acid amide of triethylene tetramine and dichlorophenoxy acetic acid/trichlorophenoxy acetic acid mixture.

Triethylene tetramine (146 parts) was heated in distillation apparatus, similar to that described in Example 1 having an agitator in the still-pot, with 570 parts of tall oil fatty acids. By the time the still-pot temperature had reached 220° C., 36 parts of water had been removed overhead. The product (VII) remaining in the still-pot was allowed to cool to room temperature and was found to be a viscous red-brown liquid. A mixture of equal parts of 2,4-D and 2,4,5-T (235 parts) was mixed with 710 parts of product (VII) and heated for about one hour at 100° C. with stirring. Upon cooling to 20° C., a thick, sticky mass was obtained which was soluble in diesel fuel to an extent that at least 75 parts of (VII) dissolved in 25 parts of diesel fuel to give a clear liquid. A 50% solution in diesel fuel readily emulsifies at least an equal weight of water to give a very viscous W/O emulsion.

*Example 5*

Salt of soya oil fatty acid amide of ethylene diamine and trichlorophenoxy acetic acid.

Soya oil (885 parts) was charged into the still-pot of apparatus as described in Example 4, 234 parts of ethylene diamine were added, and with the mixture gently agitated, it was heated to reflux. After heating for 2 hours with continuous reflux, the still-pot temperature was about 220° C. The contents of the still-pot were then cooled to 100° C. and washed twice with boiling water. Finally, the product (VIII) was dehydrated by heating to 130° C. until the material appeared to evolve no more steam. Upon cooling to about 20° C., the product was a soft pasty mass.

Trichlorophenoxy acetic acid (230 parts) was mixed with 324 parts of product (VIII) and the mass was heated to 100° C. for one hour. The resulting salt was a clear liquid at 50° C. and soluble in at least equal parts by weight in diesel fuel at that temperature to give a clear solution. Upon cooling to 20° C., the solution became clouded by precipitation of insoluble product.

Oleic acid (10 parts) was dissolved at 50° C. in 100 parts of the diesel fuel solution of product (VIII). Upon cooling this solution to room temperature, it remained clear. A W/O emulsion made from the diesel fuel solution without the added oleic acid was more viscous than a W/O emulsion made from the same proportions of water and the diesel solution containing the oleic acid.

DISCUSSION OF DETAILS

It is apparent from the general description of the invention that a wide variety of amidoamine salt-forming compounds may be used to produce the new herbicidal salts and compositions. However, certain specific compounds and classes of compounds give especially good results and are preferred, e.g., amides of polyalkylene polyamines containing 1 to 6 alkylene groups having 2 to 4 carbon atoms and N+1 amino groups where N is the number of alkylene groups with a monocarboxylic acid containing 6 to 24 carbon atoms, typically diethylene triamine with a 12–18 carbon atom fatty acid.

Examples of useable monoamides include oleoyl diethylene triamine; behenyl dipropylene triamine; stearoyl triethylene tetramine; tall oil fatty acid amide of triethylene tetramine; cotton seed oil fatty acid amide of dicyclohexylene triamine; benzoyl diethylene triamine; caproyl tributylene tetramine; toluyl diethylene triamine; toluyl p-phenylene diamine; oleoyl di-p-phenylene triamine; tall oil fatty acid amide of ethylene diamine; diethylene triamine naphthenate, benzoyl cyclohexylene diamine; hexahydroterephthalyl diethylene triamine; $N_1$-capryl, $N_3$-dodecyl diethylene triamine; $N_1$-benzoyl, $N_3$-butenyl diethylene triamine and lauroyl diethylene triamine.

Examples of useable diamides include dioleoyl diethylene triamine; tall oil fatty acid diamide of triethylene tetramine; dicaproyl tributylene tetramine; $N_1,N_3$-dibenzyl, $N_3$-hexyl diethylene triamine; $N_1,N_3$-distearoyl, $N_4$-ethyl tripropylene tetramine; cotton seed oil fatty acid diamide of dihexylene triamine; diethylene triamine dinaphthenate; disylvoyl diethylene triamine; dihexahydroterephthalyl dicyclohexylene triamine; and $N_1,N_3$-dilauroyl diethylene triamine.

Mixtures of two or more of the amidoamine salt-forming compounds may be used to react with herbicidal acids in accordance with the invention.

Various herbicidal acids may be reacted with the amidoamines to form the herbicidal salts, but aryloxyalkane monocarboxylic acids are preferred, particularly 2,4-dichlorophenoxy acetic acid and 2,4,5-trichlorophenoxy acetic acid. Other useable herbicidal acids include phenoxyacetic acid; 1-naphthoxyacetic acid; 2-naphthoxyacetic acid; 4-chlorophenoxy acetic acid; 4-chlorophenoxypropionic acid; α-(2,4-dichlorophenoxy) capioic acid; di-(4-chlorophenoxy) acetic acid; 4-bromophenoxyacetic acid; 4-fluorophenoxyacetic acid; 2-chloro,4-bromophenoxy acetic acid; 2-methyl,4-chlorophenoxyacetic acid; 2,5-diethyl,4-chlorophenoxyacetic acid; 5,7-dichloro-α-naphthoxyacetic acid; 2,4-dimethylphenoxyacetic acid and other herbicidal haloaryloxy monocarboxylic acids such as mentioned in U.S. 2,446,836. Mixtures of 2 or more of these acids may be used to form salts with the amidoamine compounds.

In forming the new herbicidal salts, 1 mol of the herbicidal acid will react with each salt forming amino group present in the amidoamine compound. As seen in Example 1 above, this can be one mol of acid per mol of amidoamine compound or the ratio may be greater as with a monoacyl polyalkylene polyamine. Further, the full stoichiometric proportion of herbicidal acid need not be used, in which case a mixture of the amide and the amide salt will be obtained. On the other hand, since the salt acts as a solvent for the herbicidal acid, more than the full stoichiometric proportion may be used, in which case a solution of the acid in the salt may be obtained. As a general rule, between about 0.5 to 3 mols of herbicidal acid per amino group can be used and typically 0.8 to 2 mols per amino group are employed. Normally the higher mol ratios are preferred since this forms products having desirable high active herbicide content. Thus, the more herbicidal acid in the product and the less proportion of amidoamine, the more potent the resulting herbicidal composition per unit cost of ingredients. Various temperatures and other conditions may be used in forming the new salts, e.g., 40° to 150° C. may be used to produce salt formation between the acid and amidoamine compound. However, the resulting compound generally is quite viscous and it has been found advisable to use a temperature of about 80° to 120° C. so that the mixture will be fluid enough to be properly agitated.

The new herbicidal salts, with added herbicidal acid dissolved in the salts, are soluble in a wide variety of readily available, inexpensive solvents, e.g., liquid hydrocarbon solvents having a boiling point above about 200° C. These herbicidal products can be dissolved in diesel fuel, kerosene, methyl naphthalene, fuel oil, turpentine, xylene, Stoddard solvent, V.M. & P naphtha, chlorinated kerosene and the like. Such solutions can be used directly as herbicides for application to vegetated areas to control plant growth. Accordingly, the proportion of active herbicidal product relative to the solvent may be varied and will depend to some extent upon the particular manner in which the herbicidal composition is to be employed. Where a concentrate consisting of a solution of the herbicidal product in a solvent is desired for mixing with water or additional solvent in the field at the point of use, solutions containing between about 1 and 5 lbs. of herbicidal product dissolved in each gallon of solution are recommended.

The preferred herbicidal concentrates of this invention are infinitely soluble in kerosene and solutions in kerosene can be used without resort to emulsification. Alternatively, the amine salts may be emulsified, without any added kerosene, to give good W/O emulsions. The amine salts may also be formed into O/W emulsions using suitable emulsifying agents, with or without added inert solvents.

The herbicidal salts of this invention may be mixed with other herbicidal products if desired for the preparation of special formulations. For example, solutions of these salts in suitable solvents may contain herbicidal esters such as the alkanol esters, glycol esters, or other esters of 2,4-D and 2,4,5-T. Such special formulations may also include, if desired, surface active agents, spreading agents, photochemical catalysts (see U.S. 2,446,836) or the like.

The use of free acid to control viscosity of herbicidal salt, as well as viscosity of W/O emulsions made therefrom, has been previously mentioned. Fatty acids, typically those having 6 to 24 and especially 10 to 18 carbon atoms are most useful for this purpose. The herbicidal acids as previously referred to may also be used with less effectiveness for this purpose. Also, other acids which may be employed in forming amidoamine compounds from polyamine compounds, typically polyalkylene polyamines, polycycloalkylene polyamines and polyarylene polyamines, as listed above, are contemplated for use in this manner. Such acids include benzoic, tolulic, hexahydroterephthalic, sylvic, naphthenic, 2-naphthoic and comparable acids. The acid may be added to the amidoamine compound before or after the salt forming step with the herbicidal acid. Of course, if added before and under conditions to evolve water, amide formation may ensue between the amine groups of the amidoamine compound and the free acid reducing the salt forming capacity of the compound. As a general rule, between about 0.01 and 1 mol of the free acid per mol of herbicidal salt may be used, typically between about 0.01 and 0.5 mol of the acid per mole of amidoamine compound or herbicidal salt.

The new herbicidal compositions may be applied to vegetated areas in any suitable washion known to the art. This includes application by misting, spraying, dusting or the like. However, as previously indicated, the new herbicidal concentrates are especially effective for the production of water-in-oil emulsions which may be applied with sling-spray dispersing equipment designed to distribute the herbicidal emulsion as large drops which cannot be easily spread by air currents to adjacent areas. Emulsions containing 5 to 15 gallons of water per gallon of herbicidal concentrate, as previously described, have been found satisfactory.

CONCLUSION

In the foregoing specification, there is described a development concerning new herbicidal compositions which contain herbicidal acids, particularly aryloxy alkane carboxylic acids, as the effective herbicidal ingredient. These improvements in herbicidal compositions are founded upon the discovery of some new herbicidal salts formed from certain amidoamine compounds containing salt-forming amino groups and the herbicidal acids. Not only are these salts soluble in low cost hydrocarbon solvents even in concentrated amounts, but also they have the ability to dissolve or solubilize very substantial quantities of the herbicidal acids. Resulting herbicidal compositions contain herbicidal agents which are of such low volatility that they may be applied to vegetated areas without creating problems of "drifting" to adjacent areas. Consequently, the invention provides a practical solution to the problem of continued use of herbicides derived from aryloxy alkane carboxylic acids in those political subdivisions or states where legislation has been passed prohibiting the use of esters of these herbicidal acids or other herbicides which are not free of drifting problems.

I claim:
1. A water-insoluble salt of an aryloxyalkane monocarboxylic acid with an amidoamine salt-forming compound having the formula:

$$R_1\overset{O}{\overset{\|}{C}}-\overset{H}{\overset{|}{N}}-A-\overset{H}{\overset{|}{N}}-Z-\overset{R_2}{\overset{|}{N}}-R_3$$

wherein
  $R_1$ is an organic radical containing from 5 to 23 carbon atoms selected from the group consisting of alkyl, alkenyl, cycloalkyl and aryl radicals,
  $R_2$ is a radical selected from the group consisting of hydrogen and $$R_1\overset{O}{\overset{\|}{C}}-$$

$R_3$ is a radical selected from the group consisting of hydrogen and 1 to 20 carbon atom alkyl and alkenyl radicals,
  A is a divalent organic radical selected from the group consisting of alkylene, cycloalkylene and arylene radicals,
  Z is a divalent organic radical selected from the group consisting of —A—, and $$-A-\left(-\overset{-N-A-}{\overset{|}{R_3}}\right)_n$$

and
  $n$ is a positive integer 1 through 6.

2. A water insoluble salt of an aryloxyalkane monocarboxylic acid and an amidoamine that is soluble in diesel fuel having the formula:

$$R_1\overset{O}{\overset{\|}{C}}-\overset{H}{\overset{|}{N}}-B-\overset{H}{\overset{|}{N}}_\oplus-B-\overset{H}{\overset{|}{N}}-\overset{O}{\overset{\|}{C}}R_1$$
$$\phantom{xxxxxxxx}{}^\ominus O C R_4 O Ar$$
$$\phantom{xxxxxxxxxxx}\overset{\|}{O}$$

wherein
  $R_1$ is an organic radical containing from 5 to 23 carbon atoms selected from the group consisting of alkyl, alkenyl, cycloalkyl and aryl radicals,
  $R_4$ is a 1 to 6 carbon atom alkylene radical,
  Ar is a halogenated aryl radical, and
  B is an alkylene radical containing 2 to 6 carbon atoms.

3. A water-insoluble salt having the formula:

$$R_1\overset{O}{\overset{\|}{C}}-\overset{H}{\overset{|}{N}}-B-\overset{H}{\overset{|}{N}}_\oplus-B-\overset{H}{\overset{|}{N}}-R_3$$
$$\phantom{xxxxxxxx}{}^\ominus O C R_4 O Ar$$
$$\phantom{xxxxxxxxxxx}\overset{\|}{O}$$

wherein
  $R_1$ is an organic radical containing from 5 to 23 carbon atoms selected from the group consisting of alkyl, alkenyl, cycloalkyl and aryl radicals,
  $R_3$ is a radical selected from the group consisting of hydrogen and 1 to 20 carbon atoms alkyl and alkenyl radicals,
  $R_4$ is a 1 to 6 carbon atom alkylene radical,
  B is an alkylene radical containing 2 to 6 carbon atoms, and
  Ar is a halogenated aryl radical.

4. A water-insoluble salt having the formula:

$$R_1\overset{O}{\overset{\|}{C}}-\overset{H}{\overset{|}{N}}-A-\overset{H}{\overset{|}{N}}_\oplus-A-\overset{H}{\overset{|}{N}}_\oplus-R_3$$
$$\phantom{xx}ArOR_4C\overset{\ominus}{O}\phantom{xx}{}^\ominus OCR_4OAr$$
$$\phantom{xxxxx}\overset{\|}{O}\phantom{xxxxxxxx}\overset{\|}{O}$$

wherein
  $R_1$ is an organic radical containing from 5 to 23 carbon atoms selected from the group consisting of alkyl, alkenyl, cycloalkyl and aryl radicals,
  $R_3$ is a radical selected from the group consisting of hydrogen and 1 to 20 carbon atom alkyl and alkenyl radicals,
  $R_4$ is a 1 to 6 carbon alkylene radical,
  A is a divalent organic radical containing 2 to 6 carbon atoms selected from the group consisting of alkylene, cycloalkylene and arylene radicals, and
  Ar is a halogenated aryl radical.

5. A water-insoluble salt having the formula:

$$R_1\overset{O}{\overset{\|}{C}}-\overset{H}{\overset{|}{N}}-A-\overset{H}{\overset{|}{N}}_\oplus-A-\overset{H}{\overset{|}{N}}_\oplus-\overset{H}{\overset{|}{N}}-R_3$$
$$\phantom{xx}ArOR_4C\overset{\ominus}{O}\phantom{xx}{}^\ominus OCR_1$$
$$\phantom{xxxxx}\overset{\|}{O}\phantom{xxxxxxxx}\overset{\|}{O}$$

wherein
  $R_1$ is an organic radical containing from 5 to 23 carbon atoms selected from the group consisting of alkyl, alkenyl, cycloalkyl and aryl radicals,
  $R_3$ is a radical selected from the group consisting of hydrogen and 1 to 20 carbon atom alkyl radicals,
  $R_4$ is a 1 to 6 carbon atom alkylene radical,
  A is a divalent organic radical containing 2 to 6 carbon atoms selected from the group consisting of alkylene, cycloalkylene, and arylene radicals, and
  Ar is a halogenated aryl radical.

6. A water-insoluble salt in accordance with claim 1 in which only one of the amine groups of said compound is combined with an aryloxyalkane monocarboxylic acid and the solubility of said salt in diesel fuel is increased by mixing free fatty acid with the salt.

7. A water-insoluble salt of an aryloxyalkane monocarboxylic acid with an amidoamine salt-forming compound having the formula:

$$R_1\overset{O}{\overset{\|}{C}}-\overset{H}{\overset{|}{N}}-C_nH_{2n}-\overset{H}{\overset{|}{N}}-C_nH_{2n}-\overset{H}{\overset{|}{N}}-R_2$$

wherein
  $R_1$ is a hydrocarbon radical containing 5 to 23 carbon atoms selected from the group consisting of alkyl, alkenyl, cycloalkyl and aryl radicals, and
  $R_2$ is a radical selected from the group consisting of hydrogen and $$-\overset{O}{\overset{\|}{C}}-R_1$$

$n$ is a positive integer 1 through 6.

8. A water-insoluble salt of an aryloxy monocarboxylic acid and an amide of a polyalkylene polyamine and a monocarboxylic acid containing between 6 and 24 carbon atoms.

9. A water-insoluble salt of multichlorophenoxy acetic acid and N,N'-diamide of diethylene triamine and tall oil fatty acid.

10. A water-insoluble salt of multichlorophenoxy acetic acid and the monoamide of diethylene triamine and tall oil fatty acid.

References Cited by the Examiner
UNITED STATES PATENTS

| | | | |
|---|---|---|---|
| 2,448,125 | 8/48 | Sallman et al. | 260—404.5 |
| 2,515,198 | 7/50 | Dosser et al. | 71—2.6 |
| 2,767,071 | 10/56 | Morrill | 71—2.6 |
| 2,891,873 | 6/59 | Falkenberg et al. | 260—404.5 |
| 3,055,924 | 9/62 | Hiestand | 260—404.5 |
| 3,079,244 | 2/63 | Scherer et al. | 71—2.6 |
| 3,093,471 | 6/63 | Pflaumer | 71—2.6 |

LEON J. BERCOVITZ, *Primary Examiner.*

J. S. SEUTT, *Examiner.*